(12) United States Patent
Puzio (10) Patent No.: US 7,591,195 B2
(45) Date of Patent: Sep. 22, 2009

(54) OPTICAL TORQUE SENSOR

(75) Inventor: Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/854,110

(22) Filed: Sep. 12, 2007

(65) Prior Publication Data

US 2008/0060451 A1 Mar. 13, 2008

Related U.S. Application Data

(60) Provisional application No. 60/825,339, filed on Sep. 12, 2006.

(51) Int. Cl.
*G01L 3/02* (2006.01)
(52) U.S. Cl. ................................ 73/862.324
(58) Field of Classification Search ..............................
73/862.322–862.331
See application file for complete search history.

(56) References Cited

U.S. PATENT DOCUMENTS

| | | | |
|---|---|---|---|
| 4,019,363 A | 4/1977 | Sanford | |
| 4,471,280 A | 9/1984 | Stack | |
| 4,558,601 A * | 12/1985 | Stasiek et al. ............ | 73/862.23 |
| 4,767,925 A | 8/1988 | Kawamoto | |
| 4,845,998 A * | 7/1989 | DeMartelaere et al. ... | 73/862.23 |
| 5,303,601 A * | 4/1994 | Schonberger et al. .... | 73/862.23 |
| 5,369,583 A | 11/1994 | Hazelden et al. | |
| 5,389,780 A | 2/1995 | Anderson | |
| 5,426,986 A | 6/1995 | Brassert et al. | |
| 5,428,217 A | 6/1995 | Nakajima et al. | |
| 5,490,430 A | 2/1996 | Anderson et al. | |
| 5,503,241 A | 4/1996 | Hiraiwa et al. | |
| 5,509,315 A | 4/1996 | Brassert et al. | |
| 5,523,561 A | 6/1996 | Ironside et al. | |
| 5,531,127 A | 7/1996 | Hazelden et al. | |
| 5,606,137 A | 2/1997 | Penketh et al. | |
| 5,636,137 A | 6/1997 | Hazelden et al. | |
| 5,686,672 A | 11/1997 | Klauber et al. | |
| 5,729,249 A | 3/1998 | Yasutake | |
| 5,805,137 A | 9/1998 | Yasutake | |
| 5,841,132 A | 11/1998 | Horton et al. | |
| 6,037,735 A | 3/2000 | Janosky et al. | |
| 6,092,615 A | 7/2000 | Pusch et al. | |
| 6,268,790 B1 | 7/2001 | Cregeur | |
| 6,427,542 B1 * | 8/2002 | Nicot ................... | 73/862.326 |
| 6,448,731 B1 | 9/2002 | Miller et al. | |
| 6,460,649 B2 * | 10/2002 | Chen et al. ................. | 180/443 |
| RE37,969 E | 1/2003 | Horton et al. | |
| 6,520,274 B1 | 2/2003 | McElmeel, Jr. et al. | |
| 6,587,211 B1 | 7/2003 | Gelbart et al. | |
| 6,597,347 B1 | 7/2003 | Yasutake | |
| 6,817,528 B2 | 11/2004 | Chen | |

(Continued)

*Primary Examiner*—Max Noori
(74) *Attorney, Agent, or Firm*—Harness, Dickey & Pierce, P.L.C.

(57) ABSTRACT

A torque sensor that includes a sensor housing, a sensor input member at least partially received in the sensor housing, a sensor output member at least partially received in the sensor housing, a torsionally resilient coupling member that couples the sensor input member to the sensor output member and an optical sensor system that includes a light source, one or more encoders and one or more optical sensors. The encoder or encoders periodically transmit light between the light source and the at least one optical sensor based on an amount of relative rotation between the sensor input member and the sensor output member.

17 Claims, 10 Drawing Sheets

U.S. PATENT DOCUMENTS

| | | |
|---|---|---|
| 6,915,710 B2 | 7/2005 | Nicholson |
| 6,948,381 B1 | 9/2005 | Discenzo |
| 6,981,423 B1 | 1/2006 | Discenzo |
| 7,395,871 B2 * | 7/2008 | Carrier et al. ............... 173/1 |
| 2002/0035876 A1 * | 3/2002 | Donaldson, Jr. ......... 73/862.21 |
| 2005/0252310 A1 | 11/2005 | Kitamura et al. |

* cited by examiner

OPTICAL TORQUE SENSOR

CROSS-REFERENCE TO RELATED APPLICATIONS

This application claims the benefit of U.S. Provisional Patent Application Ser. No. 60/825,339 entitled "No Hub Band Tool" and filed Sep. 12, 2006.

INTRODUCTION

The present invention generally relates to torque sensors and more particularly to an optical torque sensor.

It is desirable at times to turn an object, such as the screw of a no-hub clamp, with or to a predetermined torque with a relatively inexpensive tool. Driving tools, such as industrial screwdrivers, can employ complex clutches and/or electronics that are relatively expensive. Drill/driving tools that are employed by the construction trades typically employ a slip clutch, but such slip clutches typically tend to be less repeatable than is desired in some situations.

SUMMARY

In one form, the present teachings provide a torque sensor that includes a sensor housing, a sensor input member at least partially received in the sensor housing, a sensor output member at least partially received in the sensor housing, a torsionally resilient coupling member that couples the sensor input member to the sensor output member and an optical sensor system that includes a light source, one or more encoders and one or more optical sensors. The encoder or encoders periodically transmit light between the light source and the at least one optical sensor based on an amount of relative rotation between the sensor input member and the sensor output member.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
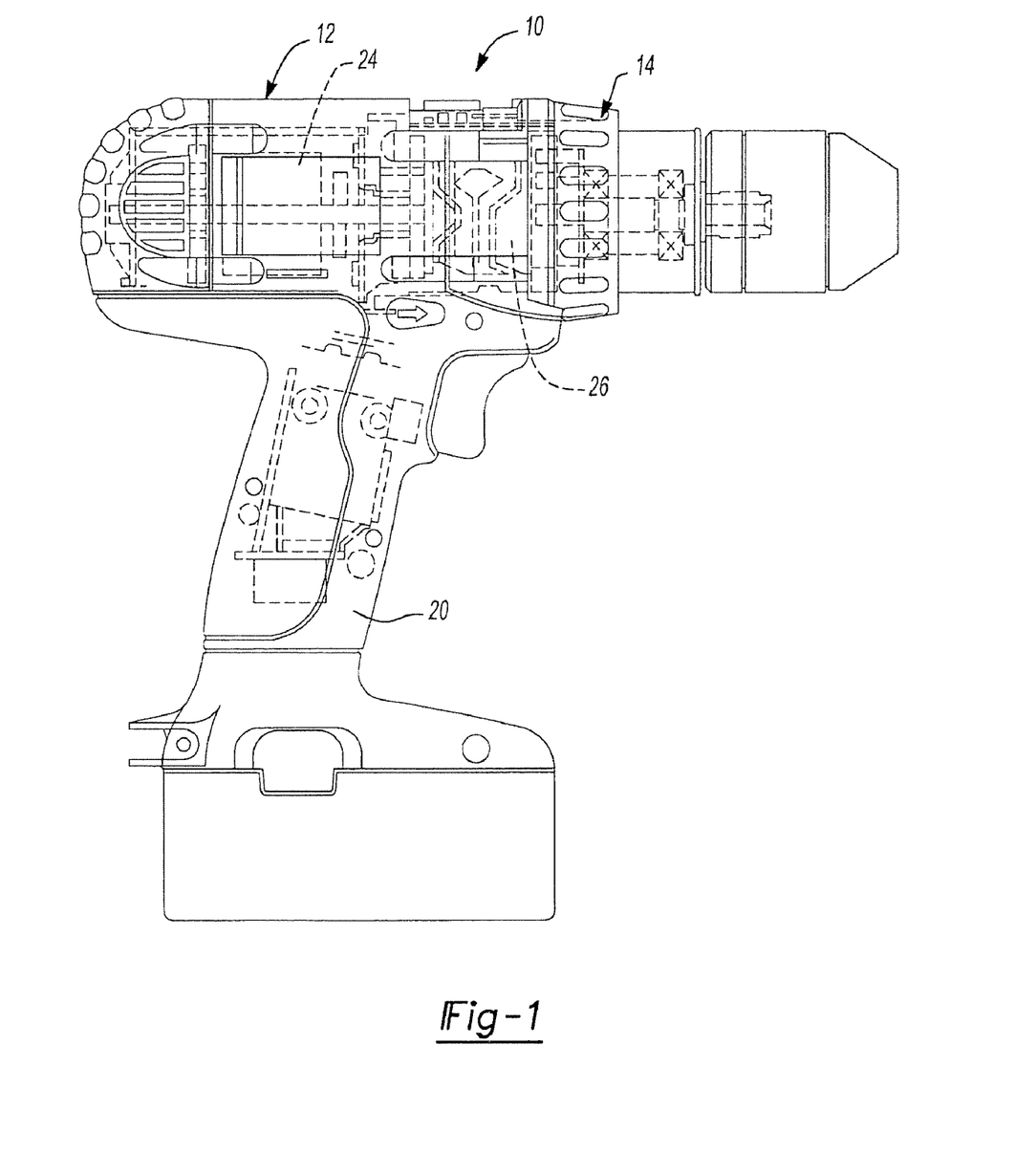
FIG. 1 is a side elevation view of an assembly constructed in accordance with the teachings of the present disclosure.

With reference to FIG. 1 of the drawings, an assembly constructed in accordance with the teachings of the present disclosure is generally indicated by reference numeral 10. The assembly 10 can include a tool portion 12 and a sensor portion 14. In the particular example provided, the assembly 10 is a driver having an integral torque sensor, but as those of ordinary skill will appreciate from this disclosure, the torque sensor (i.e., the sensor portion 14) can be fabricated as a stand-alone component and coupled in a suitable manner to a device that is configured to apply a torque (e.g., a power tool, a manual ratchet wrench).

Figure 2:
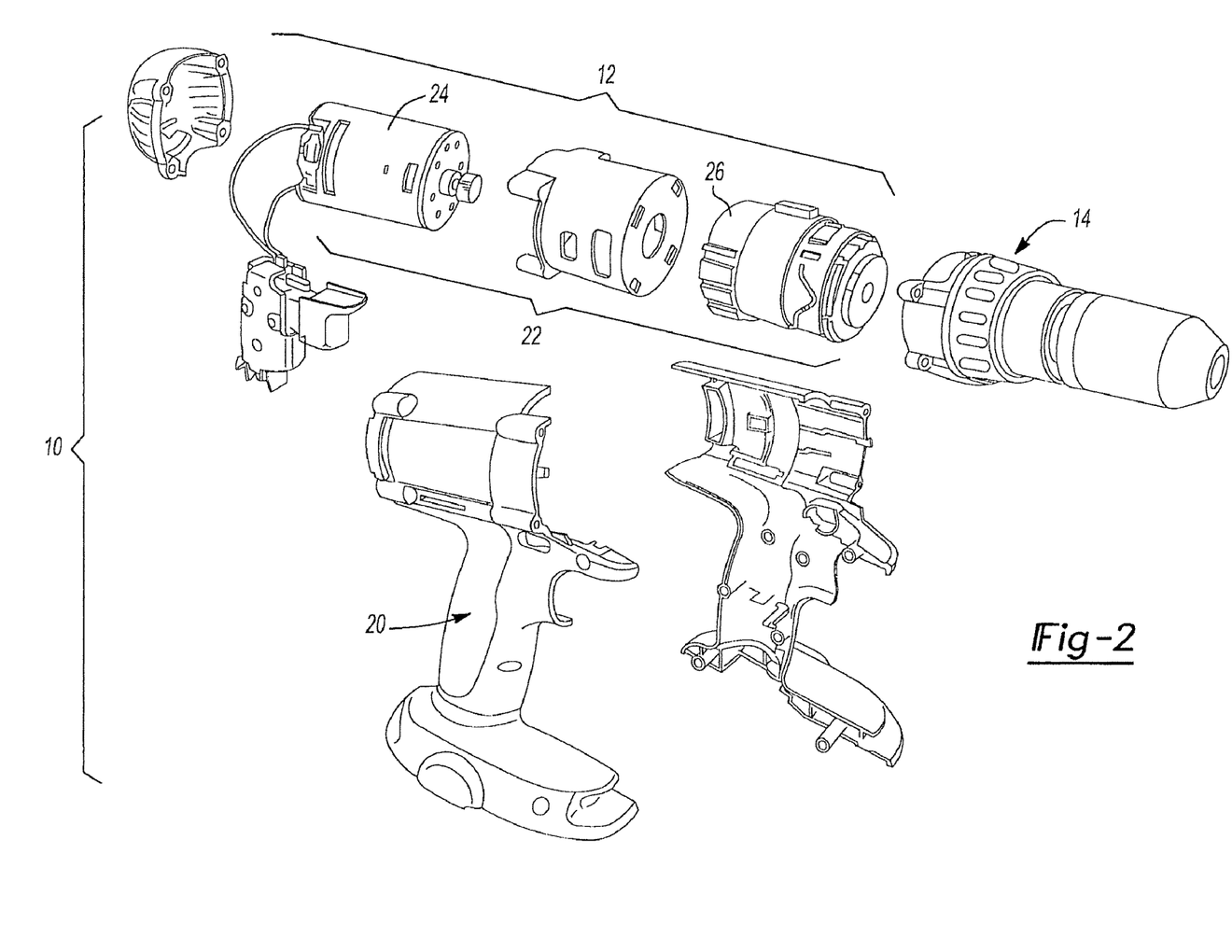
FIG. 2 is an exploded perspective view of the assembly of FIG. 1.

With additional reference to FIG. 2, the tool portion 12 can be generally similar to the drill/driver that is described in U.S. Pat. No. 6,431,289 entitled "Multi-Speed Power Tool Transmission", the disclosure of which is incorporated by reference as if fully set forth in detail herein. Briefly, the tool portion 12 can include a housing 20 and a motor assembly 22 that can be housed in the housing 20. The motor assembly 22 can include a motor 24 and a transmission 26. The motor 24 can be an electric (e.g., battery powered and/or AC powered) motor that can provide a rotary input to the transmission 26. The transmission 26 can be operated in one or more speed reduction ratios that can be employed to multiply the torque and reduce the speed of the rotary power provided by the motor 24.

Figures 3, 4:
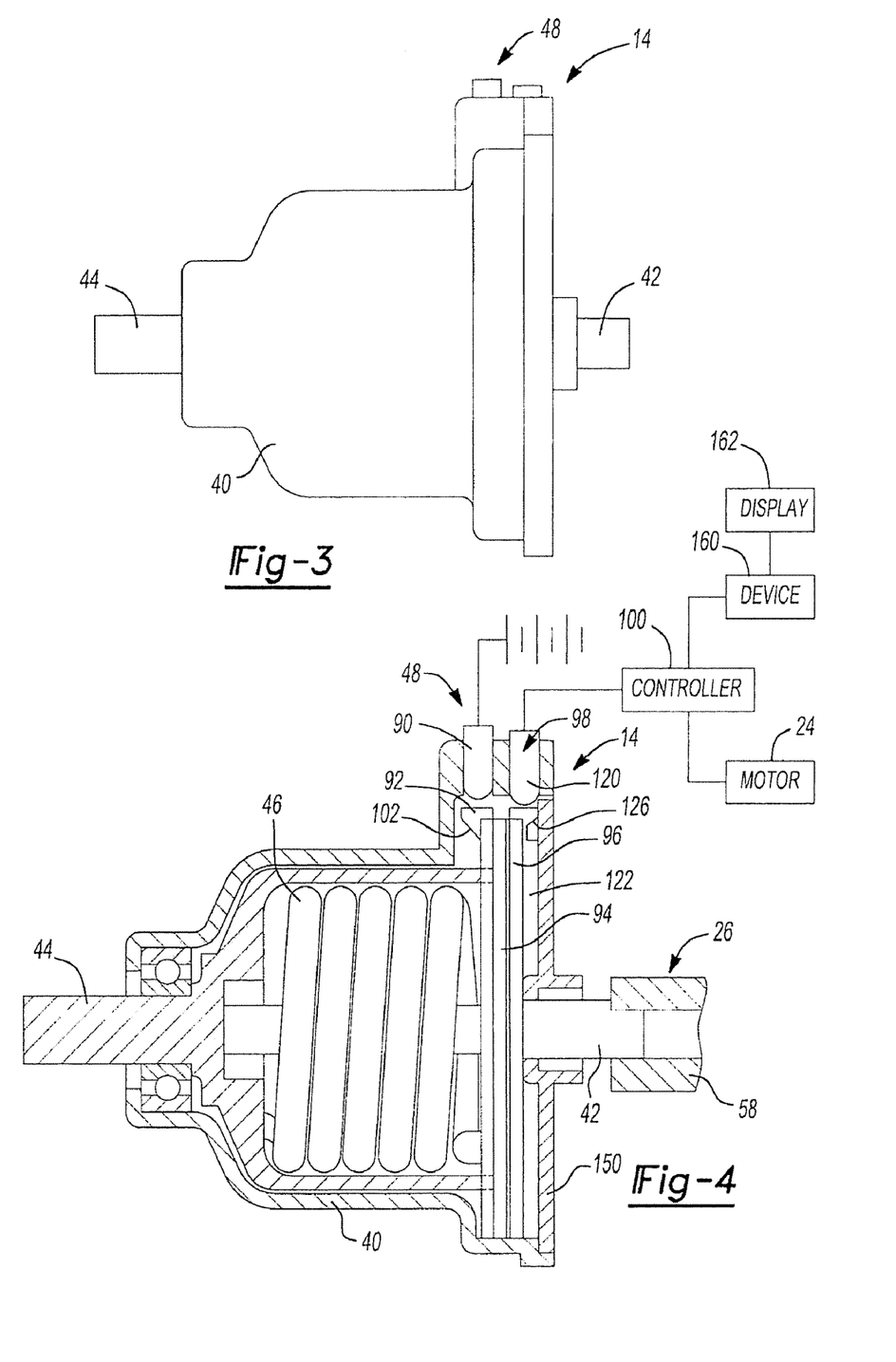
FIG. 3 is a side elevation view of a portion of the assembly of FIG. 1, illustrating the sensor portion in more detail.
FIG. 4 is a longitudinal section view of the sensor portion.

With reference to FIGS. 3 and 4, the sensor portion 14 can include a sensor housing 40, a sensor input member 42, a sensor output member 44, a coupling member 46 and an optical sensor system 48. The sensor housing 40 can be non-rotatably coupled to the housing 20 (FIG. 2) of the tool portion 12 (FIG. 2) in an appropriate manner and can house the optical sensor system 48, as well as the sensor input member 42, the sensor output member 44 and the coupling member 46. With additional reference to FIG. 5, the sensor input member 42 can include a first shank member 50, a piloting member 52 and a first body member 54 that can be disposed between the first shank member 50 and the piloting member 52. The first shank member 50 can be coupled for rotation with an output member 58 of the transmission 26. The piloting member 52 can be a shaft-like structure that can be received into an aperture 60 that can be formed in the sensor output member 44.

Figure 5:
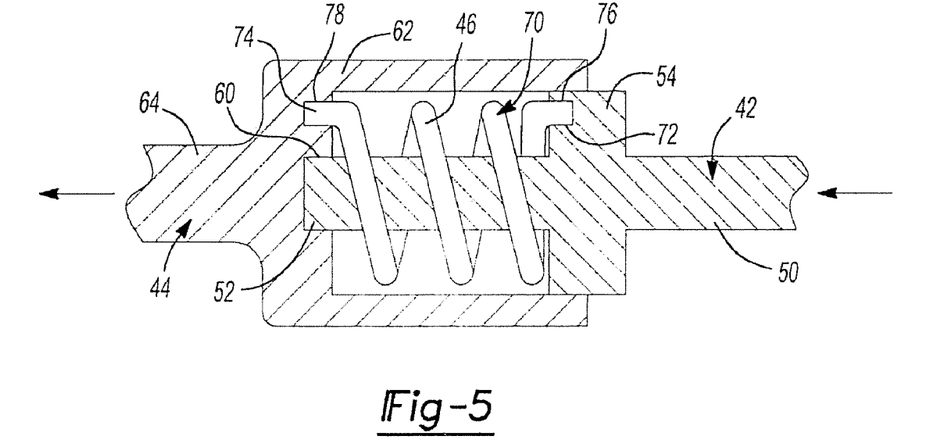
FIG. 5 is a schematic illustration of a portion of the senor portion, illustrating the connection between the sensor input member and the sensor output member.

The sensor output member 44 can include a second body member 62 and a second shank member 64. The second body member 62 can be generally cup-shaped in its construction to receive the coupling member 46 therein. The second shank member 64 can extend from the second body member 62 in a direction opposite the sensor input member 42.

The coupling member 46 can be formed of a torsionally resilient material and can rotatably couple the sensor input member 42 to the sensor output member 44. In the particular example provided, the coupling member 46 includes a torsion spring 70 that is formed of a steel wire, but those of ordinary skill in the art will appreciate from this disclosure that the coupling member can be formed (in part or in whole) from any appropriate resilient material. The coupling member 46 is configured to deflect in a predetermined rotational direction when torque is transmitted between the sensor input member 42 and the sensor output member 44 in the predetermined rotational direction. As the coupling member 46 can have a predetermined torsional spring rate, the magnitude by which the coupling member 46 deflects is dependent upon the magnitude of the torque that is transmitted therethrough in the predetermined rotational direction. In the particular example provided, the torsion spring 70 includes a first end segment 72 that is non-rotatably coupled to the first body member 54 of the sensor input member 42, and a second end segment 74 that is non-rotatably coupled to the second body member 62 of the sensor output member 44. The first and second end segments 72 and 74 can be received into holes 76 and 78 that are formed into the first and second body members 54 and 62, respectively.

The torsion spring 70 can be configured to expand radially when the tool portion 12 drives the sensor portion 14 in a rotational direction opposite the predetermined rotational direction to thereby lock the torsion spring 70 to the sensor output member 44. In the particular example provided, the torsion spring 70 can expand against the sensor housing 40 when the tool portion 12 drives the sensor portion 14 in a reverse or counterclockwise direction.

Figure 8A:
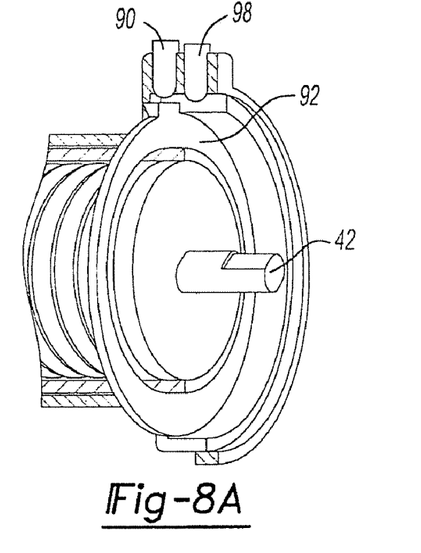
FIG. 8A is a partially sectioned perspective view of a portion of the sensor portion illustrating the light guide in more detail.
Figure 8B:
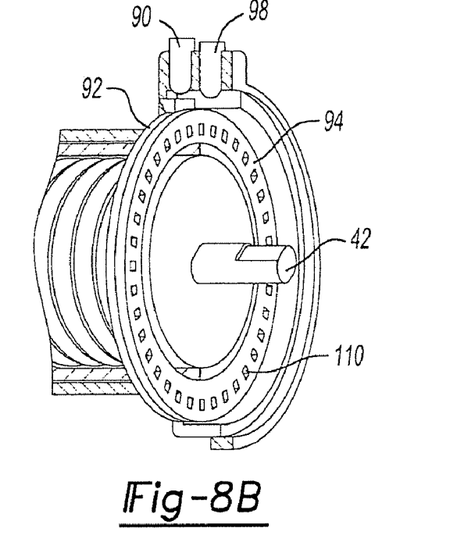
FIG. 8B is a view similar to that of FIG. 8A but which illustrates the first encoder wheel in more detail.
Figure 9:
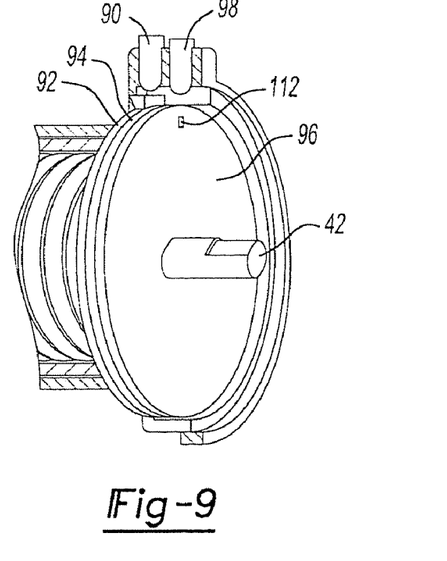
FIG. 9 is a view similar to that of FIG. 8B but which illustrates the second encoder wheel in more detail.
Figure 10:
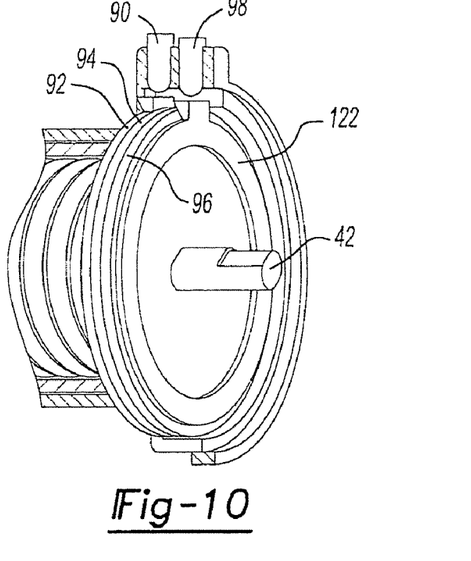
FIG. 10 is a view similar to that of FIG. 9 but which illustrates the second light guide in more detail.

Returning to FIG. 4, the optical sensor system 48 can include a light source 90, a light guide 92, a first encoder wheel 94, a second encoder wheel 96, one or more optical sensors 98 and a controller 100. The light source 90 can be any appropriate light source, such as an incandescent lamp or a light emitting diode, and can generate light, such as visible light or infra red light. The light source 90 can be housed in the sensor housing 40 and directed toward the light guide 92. With reference to FIGS. 4 and 8A, the light guide 92 can be an annular structure that can be formed of a transparent material. The light guide 92 can be configured to receive the light from the light source 90 and transmit the light toward the first encoder wheel 94. A reflector 102 can be formed into the light guide 92 to cause the light from the light source to reflect within the light guide 92 in a direction toward the first encoder wheel 94.

Each of the first and second encoder wheels 94 and 96 can be formed of an opaque material. With additional reference to FIGS. 6, 7, 8B and 9, the first encoder wheel 94 can be non-rotatably coupled to the sensor output member 44, while the second encoder wheel 96 can be non-rotatably coupled to the sensor input member 42. In the example provided, a plurality of circumferentially spaced-apart windows 110 are formed in the first encoder wheel 94 at a distance (R) from the rotational center of the first encoder wheel 94, while a single window 112 is formed in the second encoder wheel 96 at the distance (R) from the rotational center of the second encoder wheel 96. The first encoder wheel 94 is positioned relative to the second encoder wheel 96 so that a first solid part 114a of the first encoder wheel 94 is positioned in-line with the single window 112 in the second encoder wheel 96 when no torque is transmitted between the sensor input member 42 and the sensor output member 44.

Figure 6:
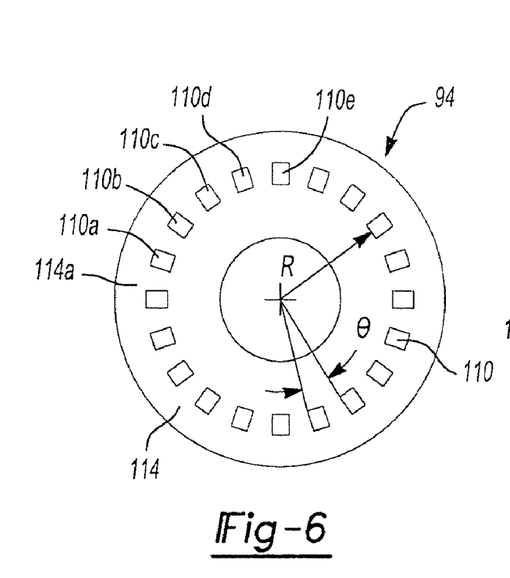
FIG. 6 is a rear view of a portion of the sensor portion, illustrating the first encoder wheel in more detail.
Figure 7:
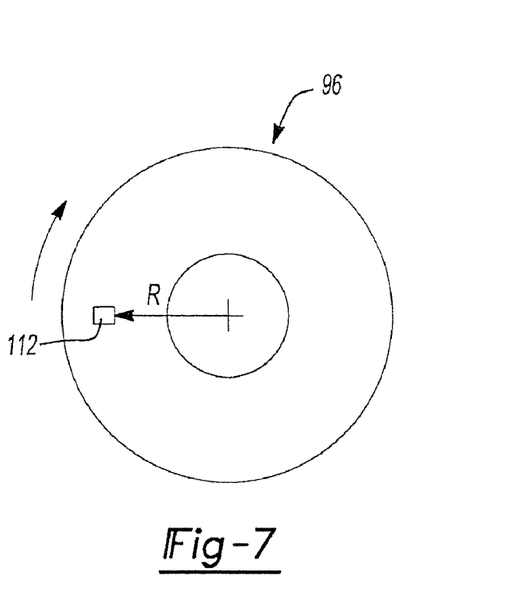
FIG. 7 is a rear view of a portion of the sensor portion, illustrating the second encoder wheel in more detail.

When increasing torque is applied in a predetermined rotational direction through the sensor portion 14, the second encoder wheel 96 will rotate relative to the first encoder wheel 94 due to the torsionally resilient nature of the coupling member 46. Accordingly, the single window 112 will rotate and sequentially align with the windows 110a, 110b, 110c, 110d and 110e. It will be appreciated that light can be transmitted through the second encoder wheel 96 when the single window 112 is aligned to one of the windows 110 in the first encoder wheel 94 and that light will not be transmitted through the second encoder wheel 96 when the single window 112 is aligned to a solid part 114 of the first encoder wheel 94 between adjacent ones of the windows 110.

Figure 11:
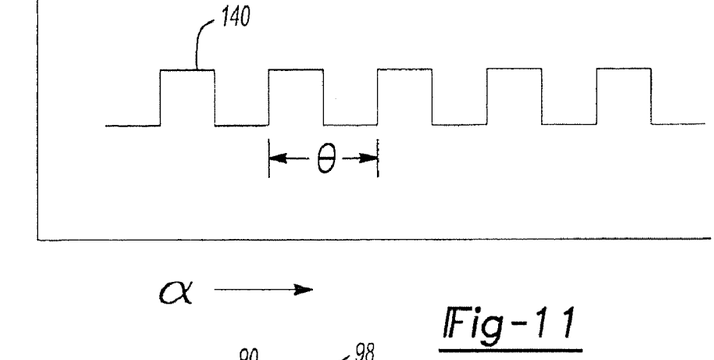
FIG. 11 is a plot illustrating the output of the single optical sensor as a function of relative rotation between the sensor input member and the sensor output member.

The optical sensor(s) 98 can be configured to detect light that is transmitted through the second encoder wheel 96. In the particular example provided, a single optical sensor 120 is employed and receives light from a second light guide 122. The single optical sensor 120 can be any type of optical sensor, such as a photo diode. The single optical sensor 120 can be housed by the sensor housing 40 and can be positioned at an appropriate position, such as spaced radially outwardly from the circumference of the second light guide 122. The second light guide 122 can be coupled to an appropriate structure, such as the sensor housing 40, and is configured to receive the light that is transmitted through the second encoder wheel 96 and to re-direct that light toward the single optical sensor 120. Like the light guide 92, the second light guide 122 can employ a reflector 126 that can cause the light that is directed into the second light guide 122 to reflect in a desired direction, such as a radially outward direction. It will be appreciated that the single optical sensor 120 will generate a first signal when light is not transmitted through the single window 112 of the second encoder wheel 96 and that the single optical sensor 120 will generate a second, different signal when light is transmitted through the single window 112. A plot showing the output of the single optical sensor 120 as a function of the magnitude of the rotation of the first encoder wheel 94 relative to the second encoder wheel 96 is illustrated in FIG. 11. As shown, the plot includes a plurality of pulses 140, each of which corresponding to a situation where the single window 112 (FIG. 7) in the second encoder wheel 96 (FIG. 7) is aligned to a corresponding one of the windows 110 (FIG. 6) in the first encoder wheel 94 (FIG. 6).

Figure 12A:
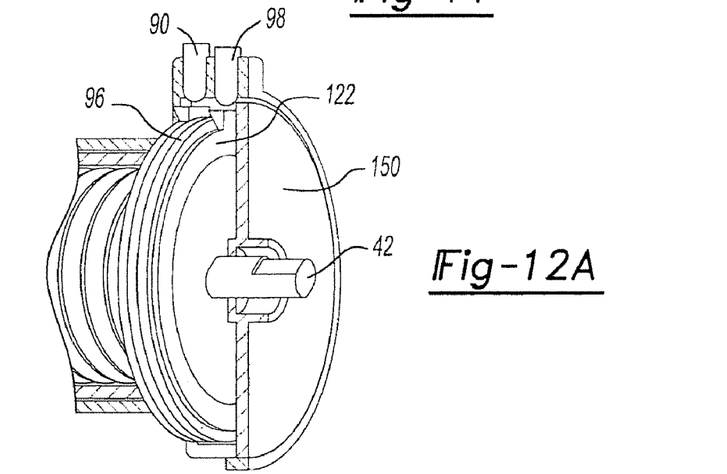
FIG. 12 is a view similar to that of FIG. 10 but which illustrates the cover in more detail.
Figure 12B:
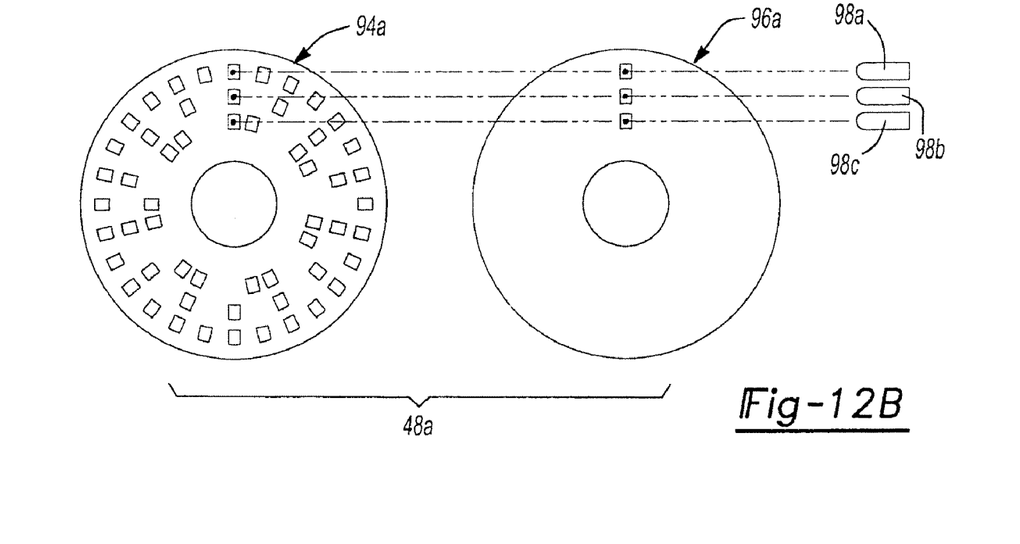
FIG. 12B is an exploded view of an alternately constructed optical sensor system that is configured to provide absolute position data.

With reference to FIGS. 4 and 12A, an optional cover 150 can be coupled to the sensor housing 40 on a side of the second light guide 122 opposite the second encoder wheel 96.

Returning to FIG. 4, the controller 100 can be coupled to the single optical sensor 120 and can receive the signals generated by the single optical sensor 120. The controller 100 can be configured in an appropriate manner to interpret the signals received from the single optical sensor 120 to thereby gauge the magnitude of the torque that is being transmitted through the sensor portion 14. In the example provided, the controller 100 is configured to count the number (n) of pulses 140 (FIG. 11) that are generated by the single optical sensor 120 and to employ the number (n) of pulses 140 (FIG. 11) in the calculation of the magnitude of the transmitted torque. It will be appreciated that each pulse 140 (FIG. 11) can be associated with the rotation of the first encoder wheel 94 relative to the second encoder wheel 96 by a predetermined angle (Θ) and as such, the magnitude of the torque that is transmitted through the sensor portion 14 can correspond to the spring rate (k) of the coupling member 46, the number (n) of pulses 140 (FIG. 11) and the magnitude of the predetermined angle (Θ) (FIG. 6) per the formula T=(k)(n)(Θ). The controller 100 can be coupled to a device 160 that can provide information (e.g., audible, visual, audible and visual) to the user of the tool portion 12. For example, the device 160 can include a display 162 that can provide a readout with a numeric value of the torque that is transmitted through the sensor portion 14. Moreover, the controller 100 may be programmed or programmable to permit the user to select the torque at which an appropriate action can be taken. Such actions include the generation of an audible signal, the generation of a control signal that is employed to halt the operation of the motor 24 that drives the tool portion 12 (FIG. 1), the operation of the motor 24 in a second, slower speed, and/or the operation of the motor 24 such that it drives the sensor output member 44 (via the transmission 26 (FIG. 2), the sensor input member 42 and the coupling member 46) through a predetermined angle of rotation, which may or may not be greater than 360°.

As those of ordinary skill in the art will appreciate from this disclosure, the optical sensor system 48 in the particular example provided is configured to provide "incremental" torque data. More specifically, the optical sensor system 48 is configured to count pulses 140 (FIG. 11) and assumes that the pulses 140 (FIG. 11) are being generated via motion in a single predetermined rotational direction. As will be appreciated, if the torque applied to a work element first increases and then decreases so that pulses 140 (FIG. 11) will be generated both as torque applied to the sensor output member 44 increases and as the torque applied to the sensor output member 44 diminishes, the optical sensor system 48 will not be able to differentiate between the pulses 140 (FIG. 11) that were generated in the two rotational directions. It will be appreciated, however, that the optical sensor system 48 could be configured in the alternative as an absolute encoder rather than as an incremental encoder, which is described above as shown in FIG. 12B, through the use of two or more optical sensors (e.g., optical sensors 98a, 98b, 98c) and first and second encoder wheels 94a and 96a that facilitate the transmission of a multi-bit set of data that uniquely identifies the relative position of the first and second encoder wheels 94a and 96a at each angular position.

Figure 13:
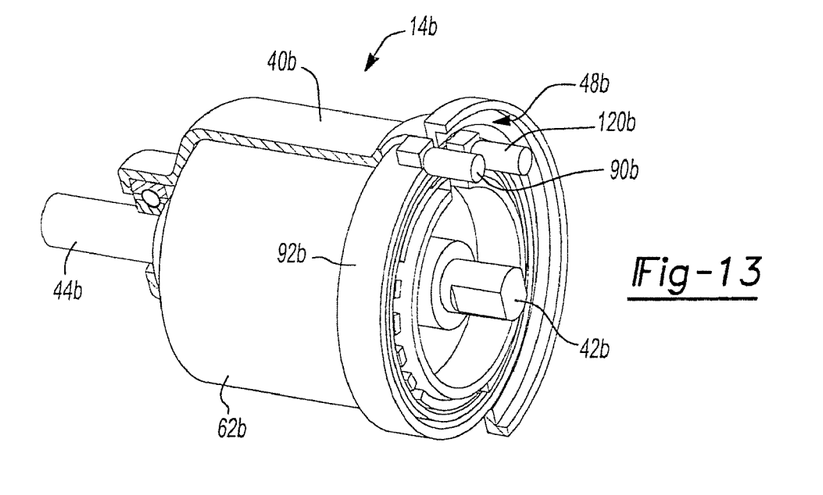
FIG. 13 is a partially sectioned perspective view of a portion of another sensor portion constructed in accordance with the teachings of the present disclosure.
Figure 14:
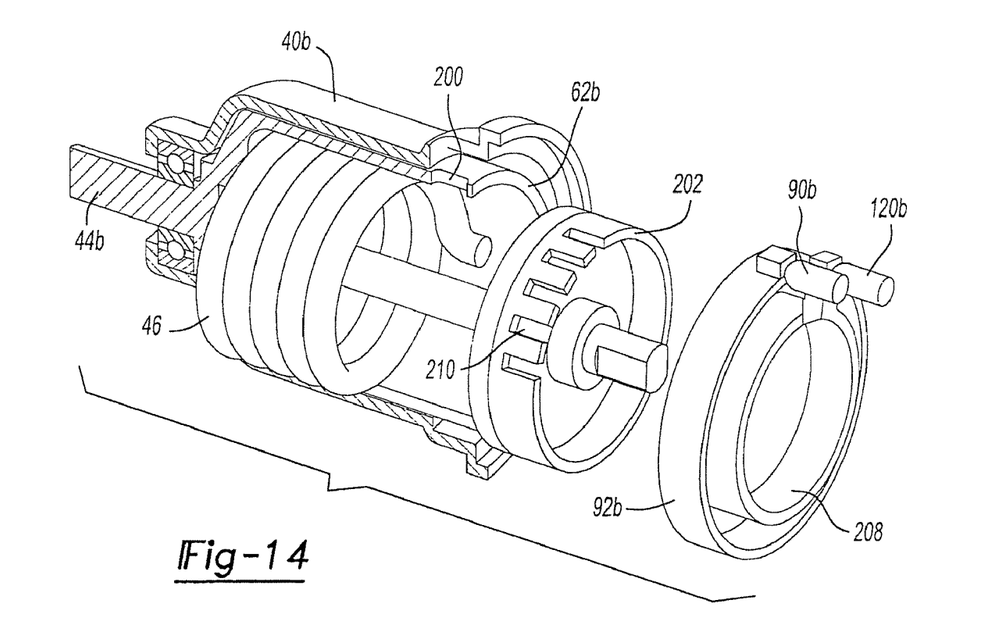
FIG. 14 is an exploded, partially sectioned perspective view of the sensor portion of FIG. 13.
Figure 15:
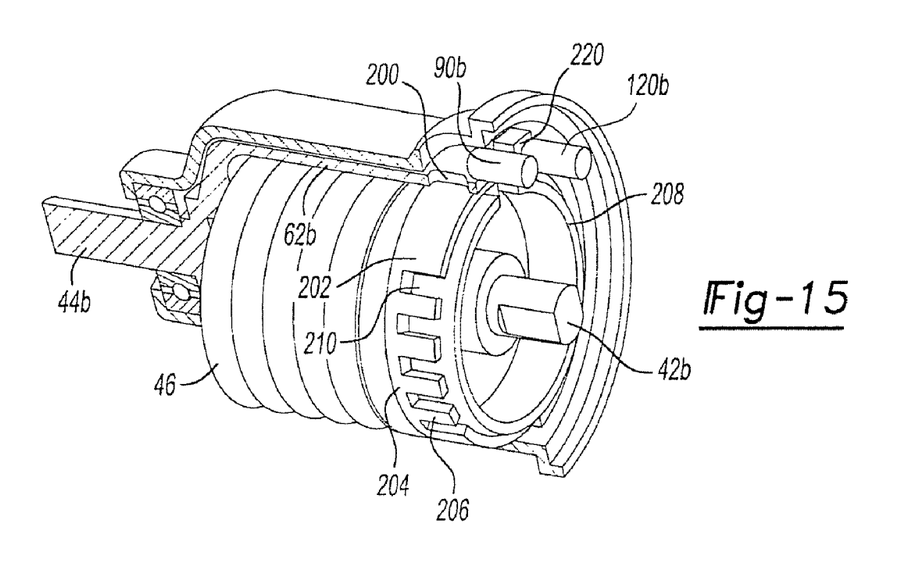
FIG. 15 is a partially sectioned perspective view of the sensor portion of FIG. 13, illustrating the sensor portion with the first annular light guide removed and the single window aligned to a tooth on the annular encoder.
Figure 16:
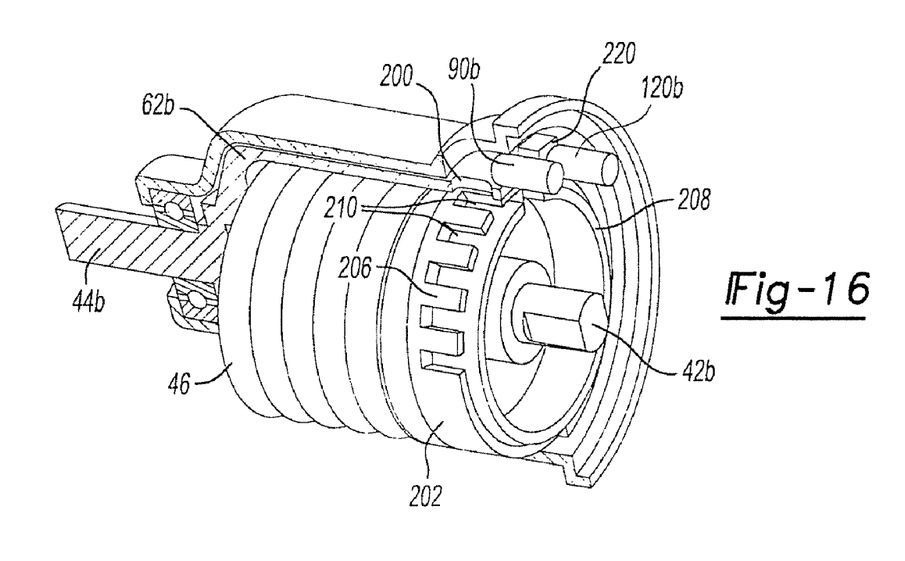
FIG. 16 is a view similar to that of FIG. 15 but illustrating the single window aligned to a space between adjacent teeth on the annular encoder wheel.

In the example of FIGS. 13 and 14, another sensor portion 14b is illustrated to be generally similar to the sensor portion 14 described above, except that the optical sensor system 48b has been aligned to an axis that is generally parallel to the rotational axis of the sensor input and output members 42b and 44b. In the example provided, a first annular light guide 92b is received into the sensor housing 40b and is configured to receive light from the light source 90b and to direct (e.g., reflect) the light from the light source 90b in a radially inward direction toward the second body member 62b of the sensor output member 44b. With reference to FIG. 15, a single window 200 can be formed through the second body member 62b, which permits light to be transmitted toward an opaque annular encoder 202 that is fixed for rotation with the sensor input member 42b. The opaque annular encoder 202 can include a backing portion 204 and a plurality of circumferentially spaced apart teeth 206 that extend rearwardly from the backing portion 204. A second annular light guide 208 can be disposed radially inwardly of the opaque annular encoder 202 and can be non-rotatably coupled to the sensor housing 40b. It will be appreciated that light from the light source 90ba is transmitted into the first annular light guide 92b and directed through the single window 200 in the sensor output member 44b toward the opaque annular encoder 202. If the single window 200 is aligned to one of the teeth 206 on the opaque annular encoder 202 as shown in FIG. 15, light will not be transmitted into the second annular light guide 208. On the other hand, if the single window 200 is aligned to a space 210 between adjacent teeth 206 on the opaque annular encoder 202 as shown in FIG. 16, light will be transmitted into the second annular light guide 208. The second annular light guide 208 can include a reflector 220 that can direct light toward a single optical sensor 120b.

Figure 17:
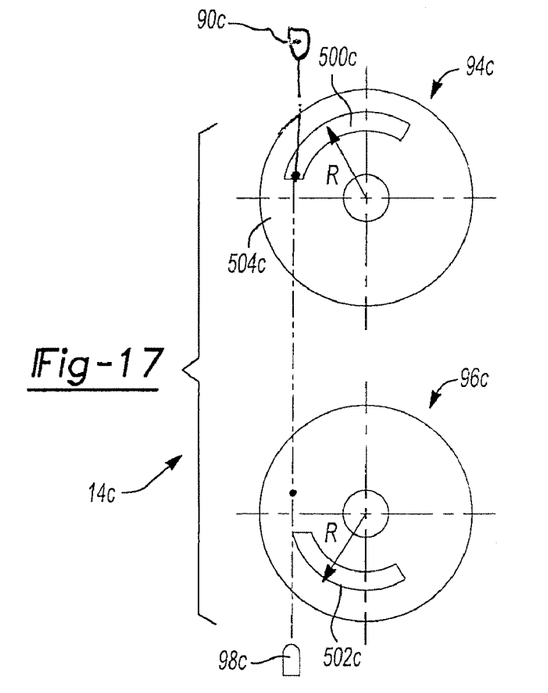
FIG. 17 is an exploded view of a portion of yet another sensor portion constructed in accordance with the teachings of the present disclosure.
Figure 18:
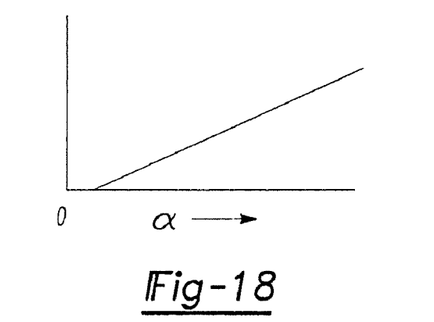
FIG. 18 is a plot showing a relationship between the output of the optical sensor of the sensor portion of FIG. 17 as a function of relative rotation between the sensor input member and the sensor output member.

A portion of another sensor portion 14c constructed in accordance with the teachings of the present disclosure is illustrated in FIG. 17. It will be appreciated that while FIG. 17 illustrates only the first and second encoder wheels 94c and 96c, respectively, these encoder wheels could be incorporated into the sensor portion 14 of FIG. 3. As such, the illustration and description of the remainder of the sensor portion 14c has not been (and need not be) included herein. The first encoder wheel 94c, which can be formed of an opaque material, can include a window 500c that extends circumferentially about a portion of the first encoder wheel 94c. The second encoder wheel 96c, which can be formed of an opaque material, includes a window 502c that extends about a portion of the second encoder wheel 96c. When the sensor portion 14c is not transmitting torque (in the predetermined direction) in excess of a predetermined threshold, the window 502c can be positioned so as to overlap a space 504c on the first encoder wheel 94c so that light from a light source 90c is not transmitted through the second encoder wheel 96c and received by an optical sensor 98c. The window 502c, however, can be increasingly aligned to the window 500c when the torque transmitted through the sensor portion 14c (in the predetermined direction) meets and then exceeds the predetermined threshold. It will be appreciated that when the window 502c will overlap the window 500c by a relatively small amount when the torque transmitted through the sensor portion 14c (in the predetermined direction) equals the predetermined threshold, and that the amount of the overlap will increase as the amount of torque that is transmitted through the sensor portion 14c (in the predetermined direction) increases. It will also be appreciated from this disclosure that that as a consequence of the increasing overlapping of the window 502c with the window 500c, the amount of light transmitted through the second encoder wheel 96c will increase as the amount of torque that is transmitted through the sensor portion 14c (in the predetermined direction) increases beyond the predetermined threshold. The optical sensor 98c can be any type of sensor that can detect the relative magnitude or intensity of the light that is transmitted through the second encoder wheel 96c and generate an output responsively. An example of one suitable output of the optical sensor 98c is illustrated in the plot of FIG. 18.

Figure 19:
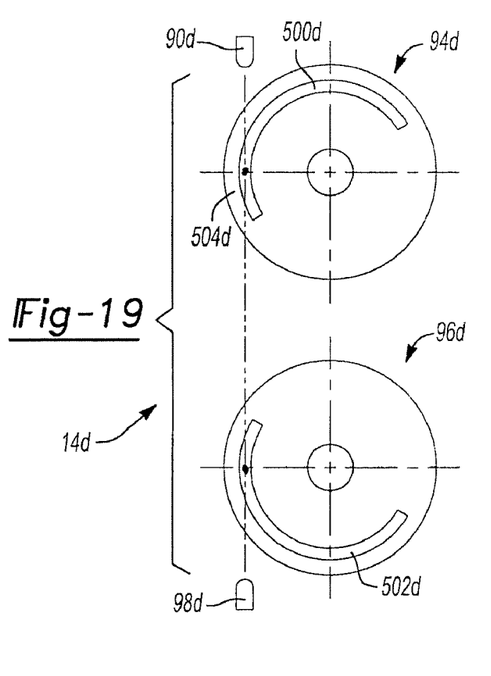
FIG. 19 is similar to FIG. 17 but illustrates first and second encoder wheels with relatively longer encoder windows that permit the sensor portion to measure torque in two rotary directions.
Figure 20:
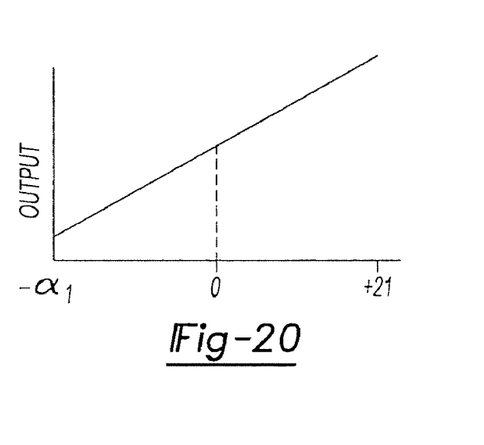
FIG. 20 is a plot showing a relationship between the output of the optical sensor of the sensor portion of FIG. 19 as a function of relative rotation between the sensor input member and the sensor output member.

A portion of another sensor portion 14d constructed in accordance with the teachings of the present disclosure is illustrated in FIG. 19. It will be appreciated that while FIG. 19 illustrates only the first and second encoder wheels 94d and 96d, respectively, these encoder wheels could be incorporated into the sensor portion 14 of FIG. 3. As such, the illustration and description of the remainder of the sensor portion 14d has not been (and need not be) included herein. The first encoder wheel 94d, which can be formed of an opaque material, can include a window 500d that extends circumferentially about a portion of the first encoder wheel 94d. The second encoder wheel 96d, which can be formed of an opaque material, includes a window 502d that extends about a portion of the second encoder wheel 96d. When the sensor portion 14d is not transmitting torque, the window 502d can be positioned so as to overlap a the window 500d on the first encoder wheel 94d so that a portion of the light from a light source 90d is transmitted through the second encoder wheel 96d and received by an optical sensor 98d. The window 502d, however, can be increasingly aligned to the window 500d when the torque transmitted through the sensor portion 14d in the predetermined direction and can be decreasingly aligned to the window 500d when torque transmitted through the sensor portion 14d increases in a direction opposite the predetermined direction. It will be appreciated that when the window 502d will overlap the window 500d by a first amount when no torque is transmitted the sensor portion 14d, that the amount of the overlap will increase as the amount of increasing torque is transmitted through the sensor portion 14d in the predetermined direction, and that the amount of the overlap will decrease as the amount of torque that is transmitted through the sensor portion 14d in the direction opposite the predetermined direction increases. It will also be appreciated from this disclosure that that as a consequence of the increasing overlapping of the window 502d with the window 500d, the amount of light transmitted through the second encoder wheel 96d will increase as the amount of torque that is transmitted through the sensor portion 14d in the predetermined direction increases and that as a consequence of the decreasing overlapping of the window 502d with the window 500d, the amount of light transmitted through the second encoder wheel 96d will decrease as the amount of torque that is transmitted through the sensor portion 14d in the direction opposite the predetermined direction increases. The optical sensor 98d can be any type of sensor that can detect the relative magnitude or intensity of the light that is transmitted through the second encoder wheel 96d and generate an output responsively. An example of one suitable output of the optical sensor 98d is illustrated in the plot of FIG. 20.

Figure 21:
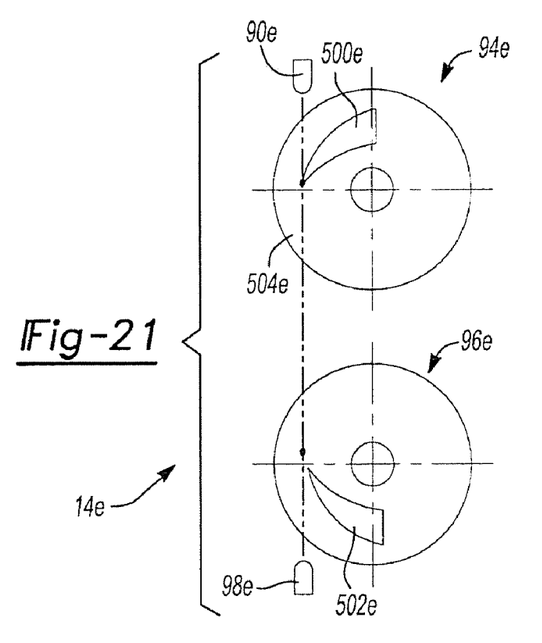
FIG. 21 is an exploded view of a portion of yet another sensor portion constructed in accordance with the teachings of the present disclosure.
Figure 22:
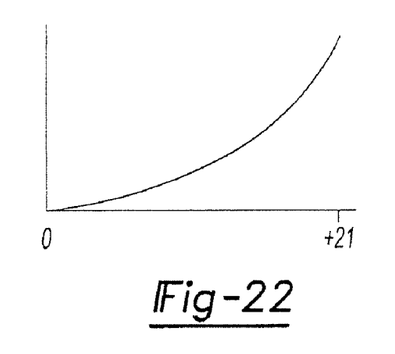
FIG. 22 is a plot showing a relationship between the output of the optical sensor of the sensor portion of FIG. 21 as a function of relative rotation between the sensor input member and the sensor output member.

While the windows 500c and 502c of FIG. 17 and the windows 500d and 502d of FIG. 19 have been illustrated as a pair of slots having concentric inner and outer edges, it will be appreciated that the windows 500c, 502c, 500d and 502d could be formed somewhat differently. For example, the windows 500c, 502c, 500d and 502d could be formed such that the amount of overlap increases and/or decreases in a non-linear manner. An example illustrating the construction of a first encoder wheel 94e and a second encoder wheel 96e with such windows is illustrated in FIG. 21. In the particular example provided (which is similar to the example of FIG. 17), the first and second encoders 94e and 96e are initially arranged such that when the sensor portion 14e is not transmitting torque (in the predetermined direction) in excess of a predetermined threshold, the window 502e can be positioned so as to overlap a space 504e on the first encoder wheel 94c so that light from a light source 90e is not transmitted through the second encoder wheel 96e and received by an optical sensor 98e. The window 502e, however, can be increasingly aligned to the window 500e when the torque transmitted through the sensor portion 14e (in the predetermined direction) meets and then exceeds the predetermined threshold. It will be appreciated that when the window 502e will overlap the window 500e by a relatively small amount when the torque transmitted through the sensor portion 14e (in the predetermined direction) equals the predetermined threshold, and that the amount of the overlap will increase as the amount of torque that is transmitted through the sensor portion 14e (in the predetermined direction) increases. As the radially inner and outer edges of the windows 500e and 502e are constructed to diverge from one another as the torque that is transmitted through the sensor portion 14e increases (in the predetermined direction) beyond the predetermined threshold, the amount of overlap between the windows 500e and 502e can increase in a non-linear manner as shown in FIG. 22.

While the examples of FIGS. 17, 19 and 21 have been described in conjunction with a sensor portion having components that are similar to that of the sensor portion 14 of FIG. 3, it will be appreciated that the teachings of the present disclosure could likewise be incorporated into the sensor portion of FIG. 13.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A torque sensor comprising:
   a sensor housing;
   a sensor input member at least partially received in the sensor housing;
   a sensor output member at least partially received in the sensor housing;
   a torsionally resilient coupling member that couples the sensor input member to the sensor output member; and
   an optical sensor system that includes a light source, at least one encoder and at least one optical sensor, the at least one encoder periodically transmitting light between the light source and the at least one optical sensor based on an amount of relative rotation between the sensor input member and the sensor output member; the sensor input member and the sensor output member being rotatably disposed about a common axis; the at least one encoder including an annular ring with a plurality of circumferentially spaced apart teeth.

2. The torque sensor of claim 1, wherein the at least one optical sensor is a single optical sensor.

3. The torque sensor of claim 1, wherein the at least one encoder includes a first encoder wheel that is coupled for rotation with the sensor input member.

4. The torque sensor of claim 3, wherein the at least one encoder includes a second encoder wheel that is coupled for rotation with the sensor output member.

5. The torque sensor of claim 4, wherein the first and second encoder wheels are spaced apart from one another along a rotational axis of the sensor input member.

6. The torque sensor of claim 1, wherein the at least one encoder includes an aperture that is formed through the sensor output member.

7. The torque sensor of claim 6, wherein an annular light guide is disposed about the sensor output member.

8. The torque sensor of claim 7, wherein a second annular light guide is disposed inwardly of the annular ring.

9. The torque sensor of claim 1, wherein the coupling member includes a torsion spring that is formed of wire.

10. The torque sensor of claim 1, wherein the optical sensor system is an incremental encoder.

11. A power tool comprising:
a tool portion having a motor and a transmission; and
a torque sensor that includes a rotatable sensor input member that is coupled for rotation with an output member of the transmission, a rotatable sensor output member, a torsionally resilient coupling member that couples the sensor input member to the sensor output member, and an optical sensor system that employs light to correlate relative rotation between the sensor input member and the sensor output member to a magnitude of a torque that is transmitted through the torque sensor;
the optical system includes a first encoder and a second encoder and an amount of light that is transmitted through the first and second encoders varies in response to the magnitude of the torque that is transmitted through the torque sensor in a predetermined direction;
the first and second encoders have a pair of windows that overlap one another to permit light to be transmitted through the first and second encoders; and
each of the windows has a pair of circumferentially-extending edges that diverge away from one another.

12. The power tool of claim 11, wherein the torque sensor further comprises a controller that controls the motor in response to the magnitude of the torque that is transmitted through the torque sensor.

13. The power tool of claim 12, wherein the controller is configured to determine that a predetermined amount of torque is transmitted through the sensor portion and to responsively cause the motor to operate so that the sensor output member is rotated through a predetermined angle.

14. The power tool of claim 12, wherein the controller is configured to determine that a predetermined amount of torque is transmitted through the sensor portion and to responsively cause the motor to halt.

15. A power tool comprising:
a tool portion having a motor and a transmission; and
a torque sensor that includes a rotatable sensor input member that is coupled for rotation with an output member of the transmission, a rotatable sensor output member, a torsionally resilient coupling member that couples the sensor input member to the sensor output member, and an optical sensor system that employs light to correlate relative rotation between the sensor input member and the sensor output member to a magnitude of a torque that is transmitted through the torque sensor;
the optical system includes a first encoder and a second encoder and an amount of light that is transmitted through the first and second encoders varies in response to the magnitude of the torque that is transmitted through the torque sensor in a predetermined direction; and
an amount of light that is transmitted through the first and second encoders decreases as increasing torque is transmitted through the torque sensor in a direction opposite the predetermined direction.

16. The power tool of claim 15, wherein each of the windows has a pair of circumferentially-extending edges that diverge away from one another.

17. A power tool comprising:
a tool portion having a motor and a transmission; and
a torque sensor that includes a rotatable sensor input member that is coupled for rotation with an output member of the transmission, a rotatable sensor output member, a torsionally resilient coupling member that couples the sensor input member to the sensor output member, and an optical sensor system that employs light to correlate relative rotation between the sensor input member and the sensor output member to a magnitude of a torque that is transmitted through the torque sensor;
the optical system includes a first encoder and a second encoder and an amount of light that is transmitted through the first and second encoders varies in response to the magnitude of the torque that is transmitted through the torque sensor in a predetermined direction; and
an amount of light that is transmitted through the first and second encoders changes based an amount of relative rotation between the first and second encoders and wherein the change is non-linear.

* * * * *